No. 804,171. PATENTED NOV. 7, 1905.
J. B. PROSKOVEC, Jr.
LISTED CORN CULTIVATOR.
APPLICATION FILED JAN. 9, 1905.
4 SHEETS—SHEET 1.
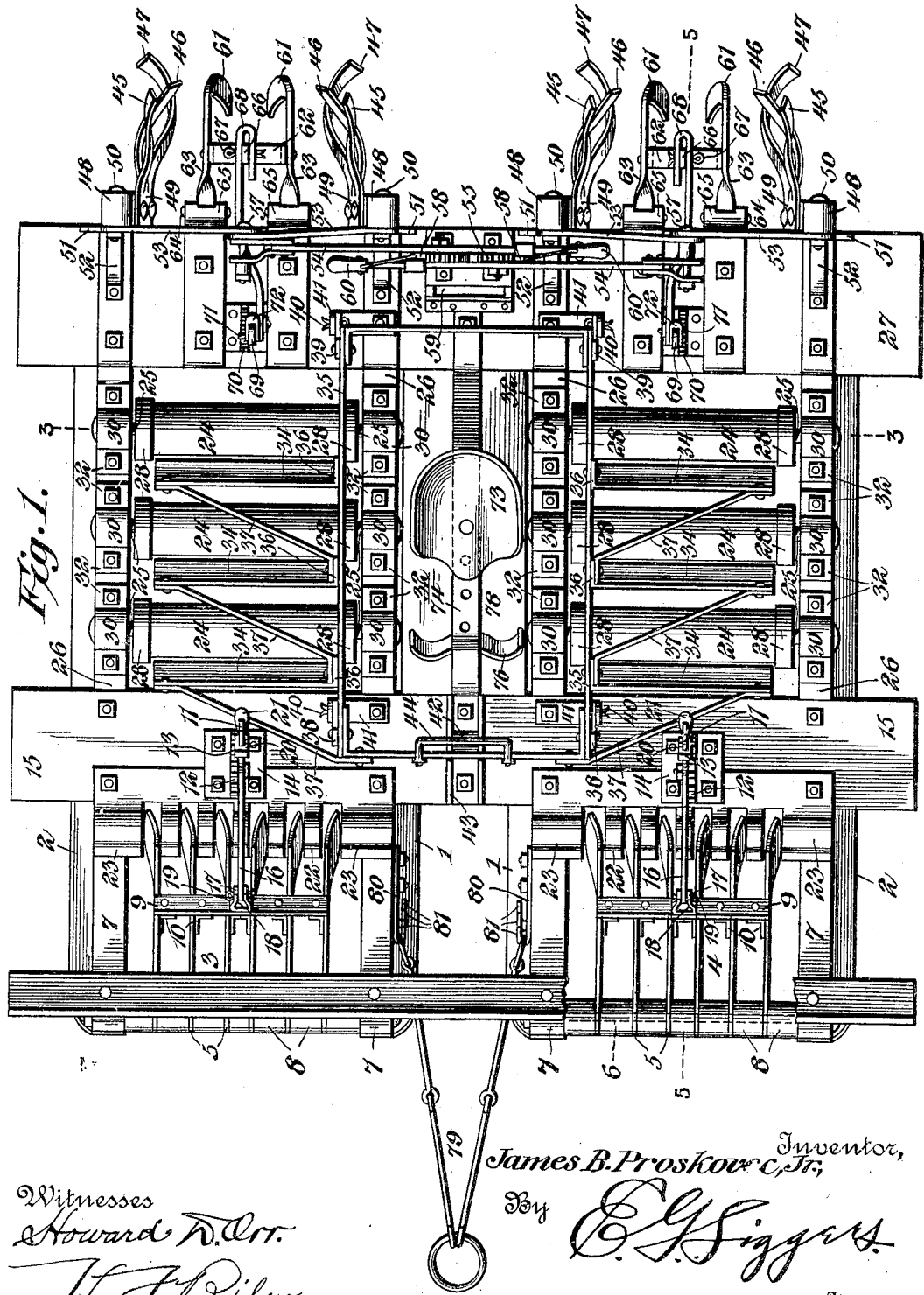
Witnesses
Howard D. Orr.
H. J. Riley
James B. Proskovec, Jr., Inventor,
By E. G. Siggers
Attorney

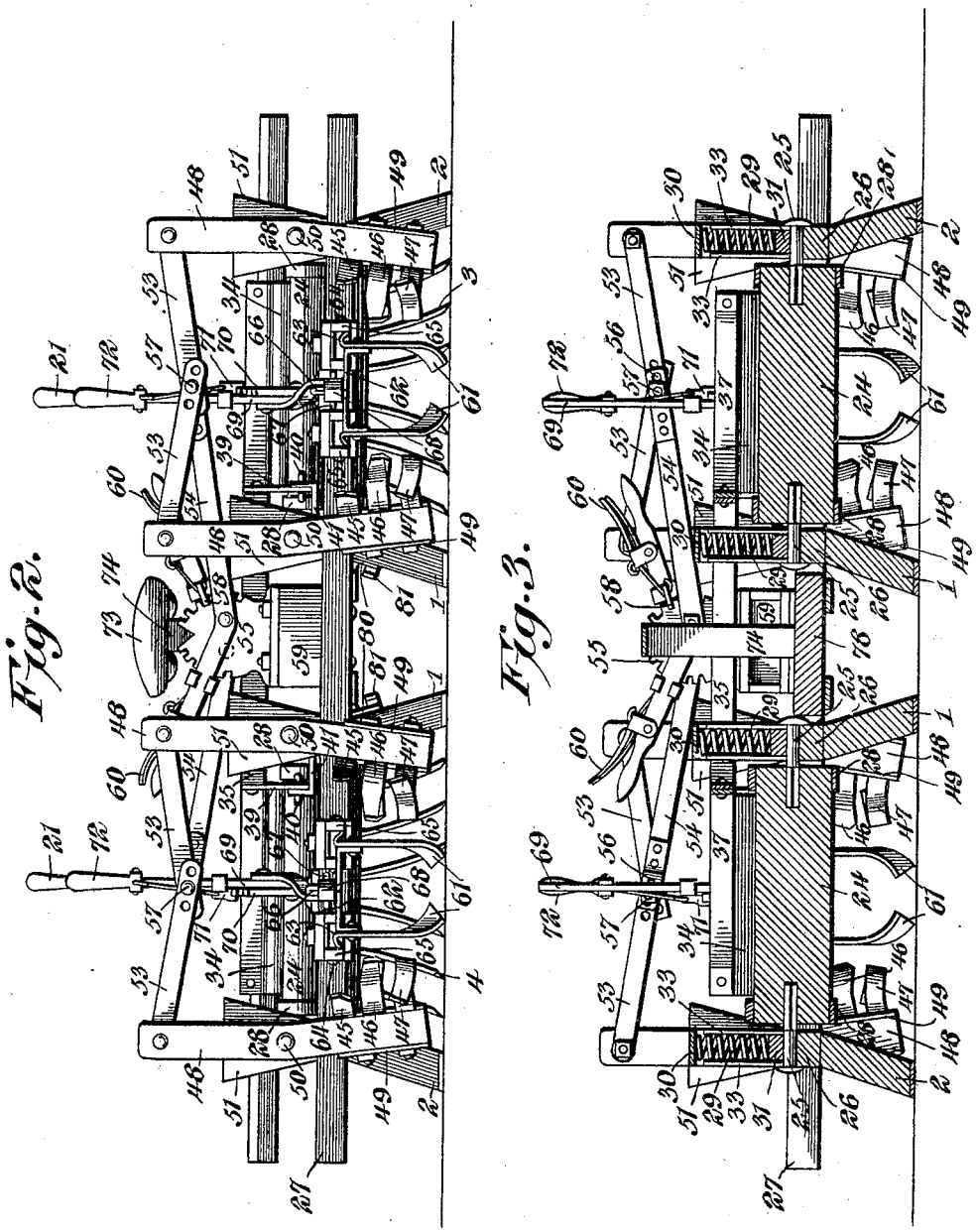

No. 804,171. PATENTED NOV. 7, 1905.
J. B. PROSKOVEC, Jr.
LISTED CORN CULTIVATOR.
APPLICATION FILED JAN. 9, 1905.

4 SHEETS—SHEET 3.

Witnesses
Howard D. Orr.
N. F. Riley.

James B. Proskovec, Jr., Inventor,
By C. G. Siggers,
Attorney

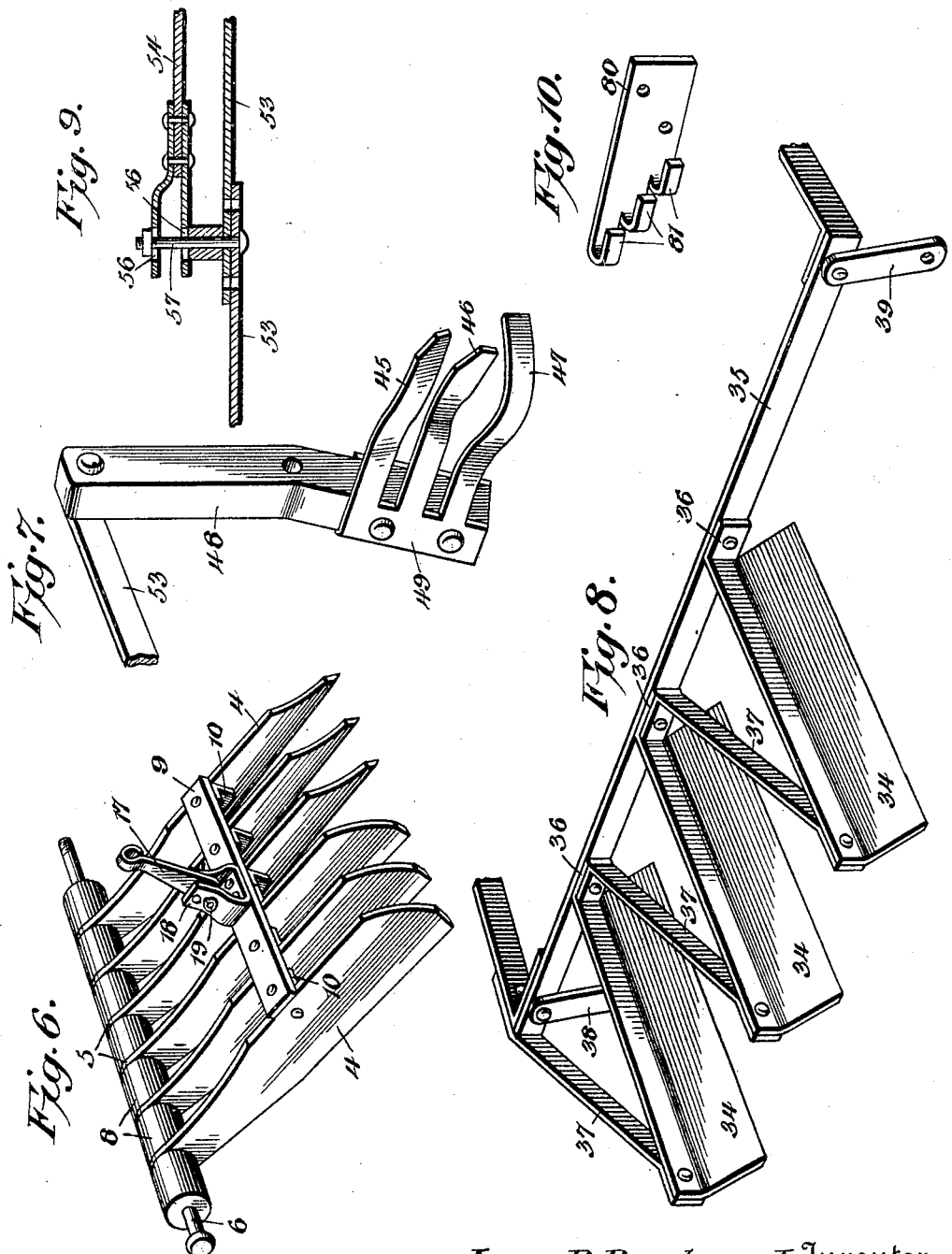

UNITED STATES PATENT OFFICE.

JAMES B. PROSKOVEC, JR., OF BRUNO, NEBRASKA.

LISTED-CORN CULTIVATOR.

No. 804,171.  Specification of Letters Patent.  Patented Nov. 7, 1905.

Application filed January 9, 1905. Serial No. 240,224.

*To all whom it may concern:*

Be it known that I, JAMES B. PROSKOVEC, Jr., a citizen of the United States, residing at Bruno, in the county of Butler and State of Nebraska, have invented a new and useful Listed-Corn Cultivator, of which the following is a specification.

The invention relates to improvements in listed-corn cultivators.

The object of the present invention is to improve the construction of listed-corn cultivators and to provide a simple and comparatively inexpensive one of great strength and durability adapted to cut down the banks between the rows of corn and capable of cutting stalks, roots, and clods into small pieces and of pulverizing the clods.

A further object of the invention is to provide a machine of this character which will cut down all kinds of injurious weeds and plants—such as cockle-burs, morning-glories, sunflowers, &c.—and which will also work the soil slowly toward the corn.

Also the invention has for its object to provide means for loosening the soil of the bank to enable it to hold water for the double purpose of preventing the bank from becoming dry and the corn from being washed out.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

Figure 4:
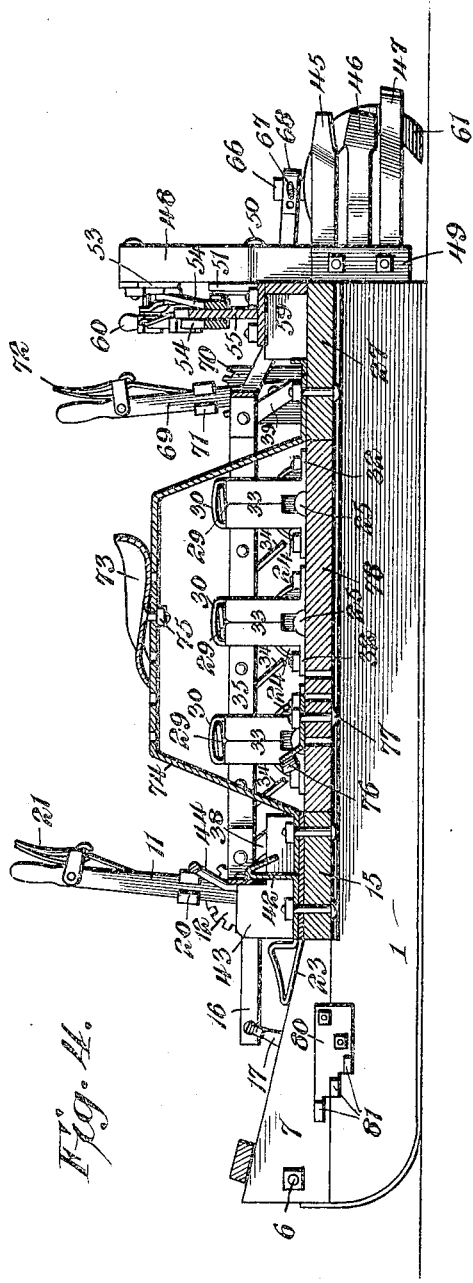
Figure 5:
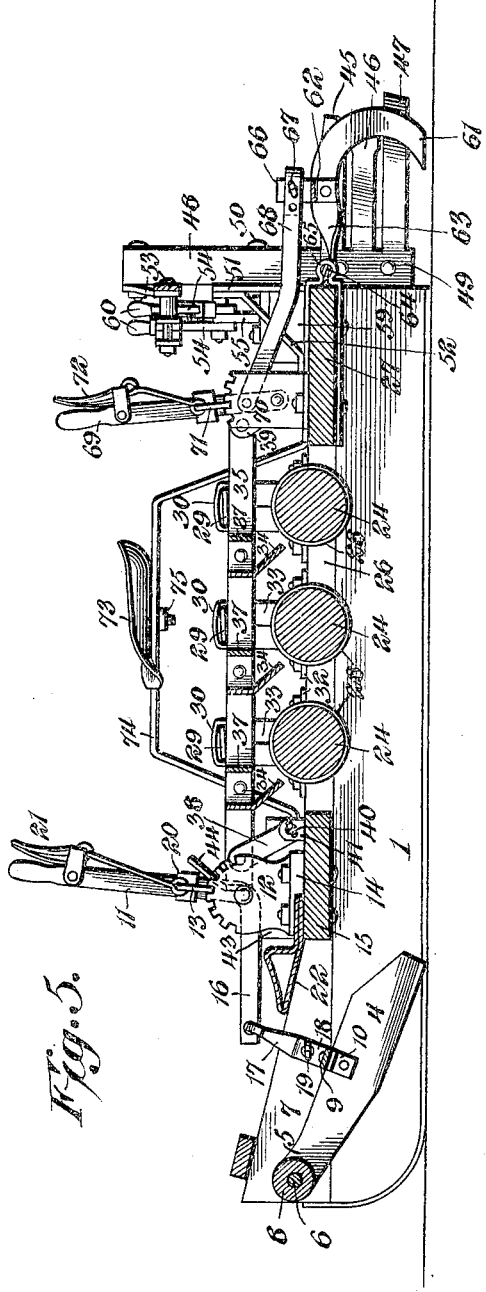

In the drawings, Figure 1 is a plan view of a listed-corn cultivator constructed in accordance with this invention. Fig. 2 is a rear elevation. Fig. 3 is a transverse sectional view taken substantially on the line 3 3 of Fig. 1. Fig. 4 is a central longitudinal sectional view. Fig. 5 is a longitudinal sectional view taken substantially on the line 5 5 of Fig. 1. Fig. 6 is a detail perspective view of one of the groups of front knives. Fig. 7 is a detail perspective view of one of the sets of rear knives. Fig. 8 is a detail perspective view of one side of the movable scrapers for cleaning the clod-crushing rolls. Fig. 9 is a detail sectional view illustrating the connection at the outer ends of the transverse levers for adjusting the rear laterally-movable knives. Fig. 10 is a detail perspective view of one of the draft-plates or clevises.

Like numerals of reference designate corresponding parts in all the figures of the drawings.

1 and 2 designate inner and outer runners arranged in pairs and connected by suitable transverse bars or beams to form a frame. The runners are adapted to guide the cultivator to permit the same to run straight, and they also prevent the cultivator from slipping on a hillside. The cultivator shown in the accompanying drawings is provided with two sets of runners, the center of the cultivator being adapted to straddle a row of corn; but in practice the mechanism shown in the accompanying drawings is designed to be duplicated to permit the cultivator to operate on the banks between and at the sides of two rows of corn. The runners, which may be connected in any desired manner to secure the desired strength, are set at a lateral inclination, the runners 1 and 2 being oppositely inclined and diverging downwardly to clear the bank between rows of corn.

The cultivator is provided at the front of the space between each pair of runners 1 and 2 with front knives 3 and 4, spaced apart and provided at their front ends 5 with eyes or openings for the reception of a transverse pintle-rod 6. The transverse pintle-rod 6 extends across the space between the runners and is mounted upon blocks 7, secured to the runners at the front ends thereof and arranged vertically. The pintle-rod, which may be of any desired construction, is preferably provided at one end with a head and at the other end with screw-threads for the reception of a nut for detachably securing the pintle-rod to the blocks or pieces 7. The front ends of the knives are spaced apart and from the blocks by spools 8, and they are connected between their ends by a transverse bar 9, which is secured to the knives by angle-plates 10. The angle-plates are L-shaped and have their arms riveted to the lower face of the connecting-bar and to the adjacent side faces of the knives. The rear ends of the right-hand knives 3 are turned slightly to the right, and those at the left-hand side are turned to the left. This enables the front knives to divide the soil and to work the same slightly toward the opposite rows of corn. The front knives are adapted to swing upward and downward to throw them into and out of operation and to arrange them at the desired depth and also for the purpose of cleaning them, and this movement of the knives is effected by means of a front longitudinally-movable lever 11, fulcrumed by a bolt or other suitable pivot on the toothed segments 12 and provided with a spring-actuated detent 13 for engaging the same. The segment is provided at the bottom with laterally-extending attachment-flanges 14, forming a base-plate and secured to the transverse connecting bar or beam 15. The lever is provided at the bottom with a forwardly-extending arm 16, which is connected by a link 17 with the connecting-bar 9. The connecting-bar 9 has upwardly-extending ears or flanges 18, provided with a plurality of perforations for the reception of the pivot 19, which also passes through the link 17. The link 17 is arranged between the ears or flanges of the connecting-bar, and when the operating-lever is oscillated the front knives will be swung upward or downward. The spring-actuated detent, which is substantially L-shaped, is provided at opposite sides with substantially U-shaped flanges 20, which embrace and slide on the opposite edges of the operating-lever. The detent is connected by a rod with a latch-lever 21 of the ordinary construction, located adjacent to the handle of the operating-lever.

Mounted upon the transverse bar or beam 15 is a fixed cleaning device, consisting of a series of forwardly-extending cleaning members or fingers 22, preferably formed integral with an attachment-plate and located above the spaces between the rear ends of the front blades and adapted when the latter are swung upward to remove the soil, stalks, roots, and the like from the front knives to prevent the same from becoming clogged. These cleaning members or fingers, which are spaced apart, are composed of approximately horizontal bottom portions and substantially V-shaped upper portions. The V-shaped upper portions are inclined at the front and vertical at the back, and they support and stiffen the members or fingers. The end cleaning members or fingers 23, which are arranged at the outer sides of the end knives, are wider than the intermediate members or fingers and extend to and are supported by the inner ends of the blocks or pieces 7. By swinging the front knives upward and downward they may be quickly and thoroughly cleaned.

The clods are crushed by a plurality of transversely-disposed rolls 24, provided at their ends with suitable journals 25, arranged in bearings of the frame, bars 26 being preferably secured to the upper edges of the runners to receive the rolls. These bars 26 extend from the front connecting bar or beam 15 to a rear connecting bar or beam 27. The crushing-rolls are provided at their ends with suitable metallic rims or tires 28 to prevent them from splitting, and the journals, which have heads at their outer ends, are preferably square at their inner portions, as clearly shown in Fig. 3 of the accompanying drawings; but the journals may be constructed in any other desired manner. The rolls are yieldably held in engagement with the clods by coiled springs 29, arranged in suitable casings or housings 30 and engaging upper bearing-blocks 31. The casings, which may be constructed in any desired manner, preferably consist of a single piece of metal bent at opposite sides of the center to form two sides and a connecting top portion and having the lower ends of the sides bent outward to provide attaching-flanges 32. The sides are provided at their inner and outer edges with inwardly-extending flanges 33, which partially close the casings or housings at the inner and outer sides. The springs yieldably hold the crushing-rolls in engagement with the clods, and they permit the rolls to move upward when they come in contact with stones or similar obstructions, whereby the rolls are prevented from being injured.

The soil when damp or wet is removed from the clod-crushing rolls by a movable cleaning device adapted to be thrown into and out of operation and consisting of opposite sets of scraper-blades 34, extending laterally from opposite sides of a rectangular frame 35 and carried by the same. The blades, which have lower inclined scraping portions and upper vertical portions, are provided at their inner ends with ears or flanges 36, which are secured to the sides of the rectangular frame. The scraper-blades are also supported by horizontal braces 37, arranged at an angle to the scraper-blades and secured at their outer ends to the same and at their inner ends to the rectangular frame at the sides thereof. The inner ends of the front braces are arranged at the front corners of the rectangular frame, and the other braces have their inner ends fitted against the adjacent flanges or ears of the scraper-blades. The rectangular frame is supported by front and rear links 38 and 39, arranged in pairs and pivoted at their upper ends to the sides of the rectangular frame at the front and rear ends thereof and detachably connected with the main frame of the cultivator by removable pivots 40, consisting of split beams arranged in perforations of the lower ends of the links and in openings of L-shaped brackets 41, which are secured to the transverse beams 15 and 27. By removing the lower pivots of the links the movable cleaning device may be readily detached from the cultivator. The links are adapted to swing backward and forward to arrange the scraper-blades in position for removing the soil from the rolls and to carry the scraper-blades away from the same. The forward movement of the links raises the scraper-blades to their inoperative position, and the frame is held against backward movement by a resilient catch 42, arranged within a casing 43 and located within the path of the front of the rectangular frame. The casing, which is open at its top, is composed of a bottom and two substantially L-shaped sides, which form a guard for the catch. The catch extends above the rear portion of the casing, and the front rectangular frame is provided with a suitable grip 44 for enabling the cleaning device to be readily disengaged from the catch when desired to carry the blades to its operative position. The blades are maintained in their operative position by their weight and the weight of the frame.

The cultivator is provided at its back with laterally-adjustable rear knives 45, 46, and 47, arranged in sets of three and mounted on approximately upright levers 48, fulcrumed between their ends and having their upper and lower arms arranged at a slight angle to each other. The knives of each set are preferably formed integral with an attachment-plate, which is angularly bent to form a partial casing or housing 49, conforming to the configuration of the lower arm of the lever and bolted or otherwise secured to the same. The levers swing laterally, and their pivots 50 are mounted on tapered stems 51, which are supported by inclined braces 52. The stems are provided at their lower ends with teeth or attachment portions, which are bolted or otherwise secured to the upper face of the rear transverse beam 27. The lower knife 47 is set at an angle and extends in a direction of the median line of the space between the runners 1 and 2. It has a slight twist, and its outer portion is curved outward to enable it to work the soil toward the corn. This knife is adapted to cut down the weeds, and its cutting action is varied by swinging inward and outward the lever upon which it is mounted. The intermediate knife, which is adapted to cut down the middle of the bank, is set at an angle, and its outer end extends toward the median line of the space between the runners 1 and 2 and is beveled or cut away slightly, as shown. The top knife is adapted to take away the rest of the bank left by the front knives, and it is set at an angle, its outer end being bent outward slightly, beveled, and slightly twisted. These knives are adapted to cut down the bank between two rows of corn, and they work the soil gradually toward the corn and at the same time cut down all injurious weeds and plants, such as morning-glories, sunflowers, cockleburs, and the like. The upper arms of the knife-carrying levers are connected by a pair of links 53 with the outer ends of the pair of transversely-disposed adjusting-levers 54, fulcrumed between their ends on a double-toothed segment 55 and having their inner and outer arms arranged at a slight angle. The outer ends of the transversely-disposed adjusting-levers are forked and provided with slots 56 to receive the pivots 57, which also pass through registering perforations of the inner ends of the links 53. The inner ends of the links 53 are overlapped and provided with a plurality of perforations to permit an adjustment of the knife-carrying levers. The inner arms of the transverse levers are provided with detents 58 for engagement with the teeth of the double segment, which is preferably mounted on a tool box or receptacle 59. The detents 58 are slidably mounted on the transverse levers like those heretofore described, and they are connected with latch-levers 60, arranged adjacent to the handles or grips of the operating-levers.

In order to loosen up the soil between the rows of corn to prevent the bank from drying out and also to keep the corn from being washed out, the cultivator is provided with vertically-movable substantially hook-shaped knives 61, arranged in pairs between the sets of laterally-movable knives and having depending cutting portions, which are curved inward slightly toward each other. Each pair of hook-shaped knives is connected by a transverse brace 62 and have quarter-bends 63 in advance of the brace to arrange the front ends of the shanks of the knives horizontally. The hook-shaped knives are provided at the ends of their shanks with laterally-extending pintles 64, arranged in suitable bearings 65, consisting of metal straps or bars provided at the bearing portions with openings, through which the shanks of the hook-shaped knives extend. The pintles extend laterally from the shanks of the hook-shaped knives and form heads for retaining the knives in engagement with the bearing portions of the straps or bars. The straps or bars are bent between their ends to form two sides and a connecting portion, the connecting portion being curved to form the bearing for the knives. The sides formed by bending the straps or bars are secured to the upper or lower faces of the transverse rear beam 27 of the main frame of the cultivator.

The connecting bar or brace of each pair of hook-shaped knives is provided with an upwardly-extending arm 66, having a plurality of perforations for the reception of a pivot 67 for securing the arm to the rear end of a loop 68. The front end of the link is connected with a rear longitudinally-swinging adjusting-lever 69, fulcrumed at its lower end to a toothed segment 70 and having a sliding detent 71 for engaging the tooth of the segment. The detent is constructed like those heretofore described and is connected with a latch-lever 72. By swinging the lever backward and forward the hook-shaped knives are raised and lowered.

The cultivator is provided with a seat 73, mounted on an arched support 74 and adjustably secured to the same by means of a threaded shank and a nut 75. The arched support is provided with a plurality of perforations for the reception of the shank. A foot-rest 76 is provided for the accommodation of the driver, and it consists of laterally-extending curved foot-receiving portions and a shank adjustably secured to the main frame by means of a bolt 77. The main frame of the cultivator is provided with a central platform portion 78, having a plurality of perforations for the reception of the fastening device 77 to permit the foot-rest to be adjusted backward and forward. The rear end of the arched support is secured to the rear transverse beam 27, and the front end of the arched support is secured within the open casing 43, which is mounted upon the transverse beam 15.

A draft attachment 79 is connected with the central runners 1 at the inner faces thereof by means of draft or clevis plates 80, provided with a plurality of hooks or engaging portions 81, arranged at different elevations. The hooks are preferably arranged in sets of three, but may be of any desired number. The central hooks are arranged to cause the cultivator to run level on an even draft, the upper hooks are adapted to produce a downdraft to cause the cultivator to run deeper, and the lower hooks afford an updraft to cause the cultivator to run less deeply. The draft attachment is provided with front and rear rings, which are connected by links. The front ring is designed to be connected with the draft-animals, and the rear rings are for engagement with the hooks of the draft or clevis plates.

Having thus fully described my invention, what I claim as new, and desire to secure by Letters Patent, is—

1. In a cultivator, the combination of a pair of spaced runners, knives arranged at intervals in the spaces between the runners and provided at their front ends with openings, a shaft passing through the openings of the knives and connecting the runners, and means for spacing the knives on the shaft.

2. In a cultivator, the combination of a pair of spaced runners, knives arranged at intervals in the spaces between the runners and provided at their front ends with openings, a shaft passing through the openings of the knives and connecting the runners, and spacing-blocks mounted on the shaft and spacing the knives from each other and from the runners.

3. In a cultivator, the combination of runners arranged in pairs, the inner members of each pair being separated by a space open at the front, transverse shafts connecting each pair of runners, sets of knives arranged at their front ends on the shaft, and means for raising and lowering each set of knives independently of the other.

4. In a cultivator, the combination of vertically-movable knives having their rear ends bent laterally, a fixed cleaning device arranged above the operative position of the knives and having fingers spaced apart to permit the knives to pass between them, said fingers being also arranged to engage the laterally-bent ends of the knives, and means for moving the knives upward and downward to adjust their depth and also to bring the knives into coöperative relation with the cleaning device.

5. In a cultivator, the combination of runners, a shaft connecting the runners, vertically-movable knives mounted at their front ends on the shaft, and a fixed cleaning device connecting the runners and arranged above the operative position of the rear ends of the knives.

6. A cultivator provided with a continuous series of simultaneously-adjustable longitudinally-disposed knives hinged at the front and arranged in two sets located at opposite sides of the center of the series and having their rear ends bent laterally for dividing the soil, the blades of each set being bent outwardly in opposite directions from the center of the series.

7. In a cultivator, the combination with a frame, of a plurality of hinged knives arranged to swing upward and downward, and a cleaning device arranged above the normal working position of the knives and consisting of a plate or body portion provided at intervals with projecting fingers arranged in the path of the knives.

8. In a cultivator, the combination with a frame, of a plurality of hinged knives arranged to swing upward and downward, and a cleaning device consisting of a plate or body portion provided at intervals with projecting fingers arranged in the path of the knives, said fingers being composed of a substantially horizontal bottom portion, an inclined upper front portion, and a rear portion connecting the inclined and horizontal portions.

9. In a cultivator, the combination of a frame having runners, casings mounted on the frame above the runners, a plurality of knives, a series of clod-crushing rolls having journals vertically movable in the casings and arranged at intervals in rear of the knives, and springs arranged within the casings and yieldably holding the rolls in position.

10. In a cultivator, the combination of a frame provided with inner and outer runners arranged in pairs, front knives arranged at intervals between the inner and outer runners, and clod-crushing rolls extending across the space between the inner and outer runners and located in rear of the knives.

11. In a cultivator, the combination with a frame, of a plurality of knives, a series of clod-crushing rolls arranged in rear of the knives, and a cleaning device provided with scraper-blades movable simultaneously toward and from the rolls.

12. In a cultivator, the combination of a frame, a series of clod-crushing rolls, and a cleaning device movably mounted on the frame and provided with laterally-extending scraper-blades arranged to be carried simultaneously toward and from the rolls.

13. In a cultivator, the combination of a frame, a plurality of clod-crushing rolls, and a movable cleaning device having oscillatory supporting-links and provided with blades.

14. In a cultivator, the combination of a frame, a plurality of clod-crushing rolls, a movable cleaning device having laterally-extending scraper-blades arranged to be carried simultaneously toward and from the rolls, and links movably supporting the cleaning device.

15. In a cultivator, the combination of a main frame, opposite sets of clod-crushing rolls, and a cleaning device comprising a frame arranged at the inner ends of the rolls and provided with laterally-extending scraper-blades, and means for movably mounting the frame to carry the blades toward and from the rolls.

16. In a cultivator, the combination of a main frame, opposite sets of clod-crushing rolls, a cleaning device embodying a frame arranged at the inner ends of the rolls, oscillatory links supporting the frame, blades mounted on the frame and extending from opposite sides of the cleaning device, and a catch for holding the cleaning device.

17. In a cultivator, the combination of a frame, opposite rolls, a cleaning device provided at opposite sides with blades, oscillatory links supporting the cleaning device and arranged at an inclination when the cleaning device is in operative position, whereby the cleaning device will be maintained in such position by gravity, and a catch arranged in the path of the cleaning device for holding the same out of operation.

18. A cultivator provided with a laterally-adjustable set of knives located at different elevations and arranged to cut down the bank and work the soil laterally.

19. A cultivator provided with a laterally-adjustable set of knives located at different elevations and arranged to cut down a bank and clear the same of plants and weeds, said set being composed of upper, lower and intermediate knives set at an angle, the lower knife having its outer portion bent outwardly.

20. A cultivator provided with a laterally-adjustable set of knives located at different elevations and arranged to cut down a bank and clear the same of plants and weeds, said set being composed of upper, lower, and intermediate knives set at an angle, the lower knife having its outer portion bent outwardly, and the outer portion of the intermediate knife being extended in the opposite direction.

21. In a cultivator, the combination of a frame, substantially upright levers fulcrumed between their ends on the frame, knives carried by the levers and located at different elevations, and means for adjusting the levers.

22. In a cultivator, the combination of a frame, approximately upright levers fulcrumed between their ends on the frame, knives mounted on the lower arms of the levers at different elevations, and means connected with the upper arms of the levers for adjusting the knives.

23. In a cultivator, the combination of a frame, levers mounted on the frame and arranged in pairs, laterally-adjustable knives carried by the levers at different elevations and extending longitudinally of the cultivator, links connecting the levers of each pair, and transversely-disposed operating-levers connected with the links.

24. In a cultivator, the combination of a frame, rearwardly-converging knives mounted on the frame, and rearwardly-extending substantially hook-shaped knives located between the said knives.

25. In a cultivator, the combination of a frame, rearwardly-converging knives mounted on the frame, and rearwardly-extending substantially hook-shaped knives located between the said knives and adjustable upward and downward.

26. In a cultivator, the combination of a frame, opposite rearwardly-converging laterally-adjustable knives, and vertically-adjustable knives operating between the said knives.

27. In a cultivator, the combination of a frame, pivotally-mounted laterally-adjustable knives carried by the frame, and vertically-adjustable substantially hook-shaped knives operating between the said knives and arranged to swing upward and downward.

28. In a cultivator, the combination of a frame having inner and outer spaced supporting means, front knives mounted between the inner and outer supporting means and arranged at intervals, opposite rolls arranged in sets in rear of the front knives, rearwardly-converging knives arranged to cut down a bank, and downwardly-extending knives operating between the rearwardly-converging knives.

29. In a cultivator, the combination of a frame provided with inner and outer runners arranged in pairs and set at an inclination, and knives carried by the frames and operating at the spaces between the inner and outer runners.

30. In a cultivator, the combination of a main frame, front and rear knives mounted on the frame, opposite rolls arranged between the knives, a movable cleaning device embodying an open frame, and knives extending from opposite sides of the frame, and seat-supporting means mounted on the main frame and located within the frame of the cleaning device.

31. In a cultivator, the combination of a frame having runners, plates mounted on the runners and provided with hooks arranged at different elevations.

32. In a cultivator, the combination with runners, of a plurality of knives mounted at the front thereof and between the same, and a roll also mounted on the runners and filling the space between the same.

33. In a cultivator, the combination with runners, of a plurality of knives mounted at the front thereof and between the same, and a series of rolls mounted on the runners and filling the space between the same, said rolls being arranged in rear of the knives.

34. In a cultivator, the combination of a frame, and a vertically-disposed lever pivoted at an intermediate point on the frame to provide upper and lower arms and carrying a plurality of knives at its lower arm and movable transversely of the travel of the machine.

35. In a cultivator, the combination of a frame, and a pair of levers pivoted at an intermediate point on the frame and movable simultaneously toward and from each other transversely of the travel of the machine, said levers carrying at their lower ends knives which extend longitudinally of the machine so as to work the soil laterally.

36. In a cultivator, the combination of a frame, and a laterally-adjustable vertically-disposed lever pivoted at an intermediate point on the frame to form upper and lower arms and provided at its lower arm with a set of knives located at different elevations movable transversely of the travel of the machine and arranged to cut down a bank and work the soil laterally.

In testimony that I claim the foregoing as my own I have hereto affixed my signature in the presence of two witnesses.

JAMES B. PROSKOVEC, Jr.

Witnesses:
L. S. HASTINGS,
E. J. DWORAK.